United States Patent [19]

Kheng

[11] 3,950,557

[45] Apr. 13, 1976

[54] SEPARATION AND COLLECTION OF EGG COMPONENTS

[76] Inventor: Chong Sue Kheng, 27 Jalan Limau Kasturi, Bungsar Park, Kuala Lumpur, Selangor, Malaysia

[22] Filed: Sept. 9, 1974

[21] Appl. No.: 504,077

[30] Foreign Application Priority Data
Sept. 19, 1973 United Kingdom............... 44050/73

[52] U.S. Cl. ................ 426/299; 426/298; 426/478; 426/495; 426/490
[51] Int. Cl.² ........................ A23B 5/04; A23L 3/36
[58] Field of Search ........... 426/478, 495, 490, 524, 426/148, 299, 298, 211, 480, 515, 518; 195/105

[56] References Cited
UNITED STATES PATENTS

| | | | |
|---|---|---|---|
| 1,496,312 | 6/1924 | Harkin | 426/299 X |
| 2,373,682 | 4/1945 | Hodson | 426/524 X |
| 3,792,184 | 2/1974 | Inagami et al. | 426/478 X |
| 3,857,974 | 12/1974 | Aref et al. | 426/524 X |

FOREIGN PATENTS OR APPLICATIONS

| | | | |
|---|---|---|---|
| 1,926,193 | 5/1969 | Germany | 426/478 |

OTHER PUBLICATIONS

Karger et al.; "An Introduction to Separation Science"; 1973, John Wiley & Sons Inc., N.Y.; pp. 314, 315.

Wilson; "Freezing Out Technique Applied to the Concentration of Biologically Active Materials"; Applied Microbiology, Vol. 12, No. 2, pp. 96–99, Mar., 1964.

*Primary Examiner*—S. Leon Bashore
*Assistant Examiner*—Kenneth M. Schor
*Attorney, Agent, or Firm*—Millen, Raptes & White

[57] ABSTRACT

A method of separating the components of eggs e.g. for microbiological processes in which the eggs are frozen and allowed to thaw and liquid components separated from solid components.

7 Claims, No Drawings

SEPARATION AND COLLECTION OF EGG COMPONENTS

FIELD OF THE INVENTION

The present invention relates to a method of separating and collecting the components of eggs for example embryonated eggs for use e.g. in the preparation of vaccines and other micro-biological purposes.

SUMMARY OF THE INVENTION

The separation and collection of the various components particularly of embryonated eggs is generally elaborate and difficult. The process entails the collection of the components in as pure and sterile a condition as possible and this is difficult under conventional methods. The fragility of the egg makes thorough cleaning and disinfection of the eggshell extremely difficult. The separation and collection process itself is intricate and laborious because of the different consistencies of the components. These components comprise embryo, embryonic membranes (hereinafter referred to as membranes), embryonic fluid, (hereinafter referred to as fluid), yolk, and albumin. The embryo and membranes are normally solid at ambient temperatures.

The invention is aimed at providing a simple and effective method of harvesting the components of eggs which allows clean and best possible sterile conditions to be maintained.

According to the invention there is provided a method of separating the components of eggs in which a part of the contents is rendered solid and the liquid and solid components separated and collected.

Preferably the eggs are frozen and cut into two or more parts while at least substantially solid and the components separated and collected as they thaw.

The preferred form of the invention is hereafter more particularly described.

DETAILED DESCRIPTION OF EMBODIMENT

Prior to harvesting the eggs are frozen for example in a domestic freezer at a temperature for example −20°C. At this temperature the eggs are easy to handle; they are less likely to break and even if the eggshell cracks there is no resulting mess. The shells can be efficiently cleaned and disinfected. If desired the eggs may be frozen at a much lower temperature e.g. −40°C to −60°C to delay thawing.

While in a frozen condition the shell surfaces are preferably cleaned and disinfected. The eggs may be cleaned by hand or in an egg washing machine. They can be immersed in disinfectant with little risk of absorption through the shell. Final disinfection of the eggshell may be carried out by chemical means, a flame or by means of boiling water if carried out rapidly. If it proves necessary the eggs may be further frozen before cutting.

The frozen egg is cut into two or more parts either along its short or long axis e.g. by means of an electric circular or band saw. The eggs can be cut individually or in groups of six, twelve or more in a specially designed egg holder. The sterility of the saw can be maintained for example by directing jets of steam onto the blade.

The components of the egg thaw at different rates and use is made of this phenomenon in the process of the invention. Thawing can be accelerated if desired by the application of heat. It is preferred firstly to remove the contents from the shell and transfer them for example to a sieve which is fitted over a receptacle. The fluid fraction of the egg, which is the first to thaw, passes through the sieve into the receptacle below. Normally, solid components such as the embryo and membranes and other solid and semi-solid components, such as the yolk and albumin while still partially frozen, may be picked out by forceps.

Alternatively, before cutting, the egg can be only partially frozen or partially thawed from the frozen state, so that the solid and semi-solid fractions are virtually frozen and the fluid fraction remains liquid. To expose its contents the egg is cut approximately across the air space by saw, a fine jet of flame or scissors. The contents are then poured on to a sieve fitted over a receptacle to collect the fluid, or the fluid can be siphoned out by suction as under conventional methods with little risk of admixture with other components.

This modification can be adapted for the separation and collection of egg components of table eggs (fresh edible eggs) with the yolk intact. The eggs need to be only partially frozen or partially thawed from the frozen state so that the albumen retains its semi-fluid consistency and the yolk remains virtually frozen. The sieve or screen for table eggs needs to have mesh which will allow liquid albumen to pass through while the frozen whole yolk is retained. The two components can be separated and collected with greatest of ease and with little risk of admixture.

The method of the invention is simple and rapid. Large numbers of eggs can be dealt with simultaneously. The labour and skill involved is reduced to minimum. The separation process by hand is extremely simple and requires little skill. The method encourages clean and best possible sterile conditions of work and contamination is reduced to a minimum no expensive equipment is necessary. However the method is capable of mechanization and full automation if necessary. For example, eggs cut in packages can be picked up by vacuum egg lifters and on application of heat the contents can be transferred on to the sieve and the shells discarded. Alternatively, use can be made of a vibrating table or of air or other gas to separate shell components from the interior components. The thawing components can be separated by any suitable liquid/solid separating technique, e.g. centrifugation or vacuum filtration. Thus the sieve can be replaced by any suitable semi-permeable barrier. Under fully mechanized conditions, the eggs can be maintained at a controlled temperature during separation of the liquid and solid components to maximize the efficiency of separation.

However the process, being simple, is eminently suitable for use in agricultural areas near the source of eggs or in under developed countries or communities having a large semi-skilled labour force.

I claim:

1. A method of separating various components of an egg comprising lowering the temperature of said egg to a temperature at which a desired portion of said components are substantially solidified, whereas the remaining portion of said components remain liquid, cutting the shell of said egg, and separating the said solidified portions from the said liquid portion.

2. The method of claim 1 wherein the temperature of said egg is lowered to a temperature at which all the said components are solidified, said egg shell is cut, said egg is thawed and said components are separated during thawing of said egg.

3. The method of claim 2 wherein said solidified egg is removed from said cut shell, said separated frozen egg is permitted to thaw on means for separating liquids from solids, and collecting the thawed portions of said egg.

4. The method of claim 3 where said separating means are sieve means.

5. The method of claim 1 wherein said solidified portions are separated from said liquid portions by collection of said solidified portions with forceps.

6. The method of claim 1 wherein said egg is cut with sterilized saw means.

7. The method of claim 1 wherein the shell surfaces of said egg after its temperature has been lowered are washed and disinfected.

* * * * *